US011196919B2

(12) United States Patent
Chen et al.

(10) Patent No.: US 11,196,919 B2
(45) Date of Patent: Dec. 7, 2021

(54) IMAGE PROCESSING METHOD, ELECTRONIC APPARATUS, AND COMPUTER-READABLE STORAGE MEDIUM

(71) Applicant: Guangdong OPPO Mobile Telecommunications Corp., Ltd., Guangdong (CN)

(72) Inventors: Yan Chen, Guangdong (CN); Pan Fang, Guangdong (CN)

(73) Assignee: SHENZHEN HEYTAP TECHNOLOGY CORP., LTD., Shenzhen (CN)

(*) Notice: Subject to any disclaimer, the term of this patent is extended or adjusted under 35 U.S.C. 154(b) by 0 days.

(21) Appl. No.: 16/546,874

(22) Filed: Aug. 21, 2019

(65) Prior Publication Data
US 2020/0068123 A1 Feb. 27, 2020

(30) Foreign Application Priority Data

Aug. 22, 2018 (CN) .......................... 201810961959.X

(51) Int. Cl.
*H04N 5/232* (2006.01)
*H04N 5/247* (2006.01)
(Continued)

(52) U.S. Cl.
CPC ........... *H04N 5/23229* (2013.01); *G06T 7/55* (2017.01); *H04N 5/04* (2013.01); *H04N 5/2253* (2013.01);
(Continued)

(58) Field of Classification Search
CPC .... H04N 5/23229; H04N 5/04; H04N 5/2253; H04N 5/23251; H04N 5/247; H04N 5/01; G06T 7/55
(Continued)

(56) References Cited

U.S. PATENT DOCUMENTS 9,456,195 B1 *   9/2016 Wajs ..................... H04N 19/176
2007/0019931 A1 * 1/2007 Sirbu .................. H04N 21/4394
                                                    386/207
(Continued)

FOREIGN PATENT DOCUMENTS

CN    102959941 A    3/2013
CN    103530599 A    1/2014
(Continued)

OTHER PUBLICATIONS

International search report for PCT/CN2019/100388, dated Oct. 29, 2019 (4 pages).
(Continued)

*Primary Examiner* — Joseph G Ustaris
*Assistant Examiner* — Jimmy S Lee
(74) *Attorney, Agent, or Firm* — Young Basile Hanlon & MacFarlane, P.C.

(57) ABSTRACT

An image processing method and device, an electronic apparatus, and a computer-readable storage medium are provided. The method includes: acquiring a first image captured by a first camera, and determining a first timestamp according to the first image, wherein the first timestamp is configured to represent a time point on which the first image is captured; acquiring at least two second images captured by a second camera, and determining a second timestamp according to the at least two second images; and processing the first image and the at least two second images when a time interval between the first timestamp and the second timestamp is smaller than a first interval threshold.

18 Claims, 7 Drawing Sheets

(51) Int. Cl.
*H04N 5/04* (2006.01)
*H04N 5/225* (2006.01)
*H04N 7/01* (2006.01)
*G06T 7/55* (2017.01)

(52) U.S. Cl.
CPC ......... *H04N 5/23251* (2013.01); *H04N 5/247* (2013.01); *H04N 7/01* (2013.01)

(58) Field of Classification Search
USPC ....................................................... 348/135
See application file for complete search history.

(56) References Cited

U.S. PATENT DOCUMENTS

| | | | |
|---|---|---|---|
| 2013/0058573 A1* | 3/2013 | Suzuki | H04N 5/23264 382/167 |
| 2013/0100255 A1 | 4/2013 | Ohba et al. | |
| 2014/0111638 A1* | 4/2014 | Isakov | H04N 5/23222 348/135 |
| 2016/0057352 A1* | 2/2016 | Yoneda | H04N 5/23251 348/208.4 |
| 2016/0065889 A1* | 3/2016 | Maurice | H04N 19/44 348/447 |
| 2016/0088280 A1 | 3/2016 | Sadi et al. | |
| 2017/0272600 A1* | 9/2017 | Ayalasomayajula | H04N 5/247 |
| 2018/0082136 A1* | 3/2018 | Sasamoto | G06K 9/00335 |
| 2018/0205963 A1* | 7/2018 | Matei | H04N 21/816 |
| 2018/0288292 A1* | 10/2018 | Moggridge | G01J 3/2823 |
| 2019/0068972 A1* | 2/2019 | Sasaki | H04N 5/232 |

FOREIGN PATENT DOCUMENTS

| | | |
|---|---|---|
| CN | 104811684 A | 7/2015 |
| CN | 106161943 A | 11/2016 |
| CN | 107124604 A | 9/2017 |
| CN | 107404362 A | 11/2017 |
| CN | 108989606 A | 12/2018 |
| GN | 107148640 A | 9/2017 |
| WO | 2014154839 A1 | 10/2014 |

OTHER PUBLICATIONS

European search report, EP19192224, dated Jan. 24, 2020 (11 pages).
English translation of First Office Action from China patent office in a counterpart Chinese patent Application 201810961959.X, dated May 18, 2020 (15 pages).
Indian Examination Report, Application No. 201914032755 dated Nov. 24, 2020 (6 pages).

* cited by examiner

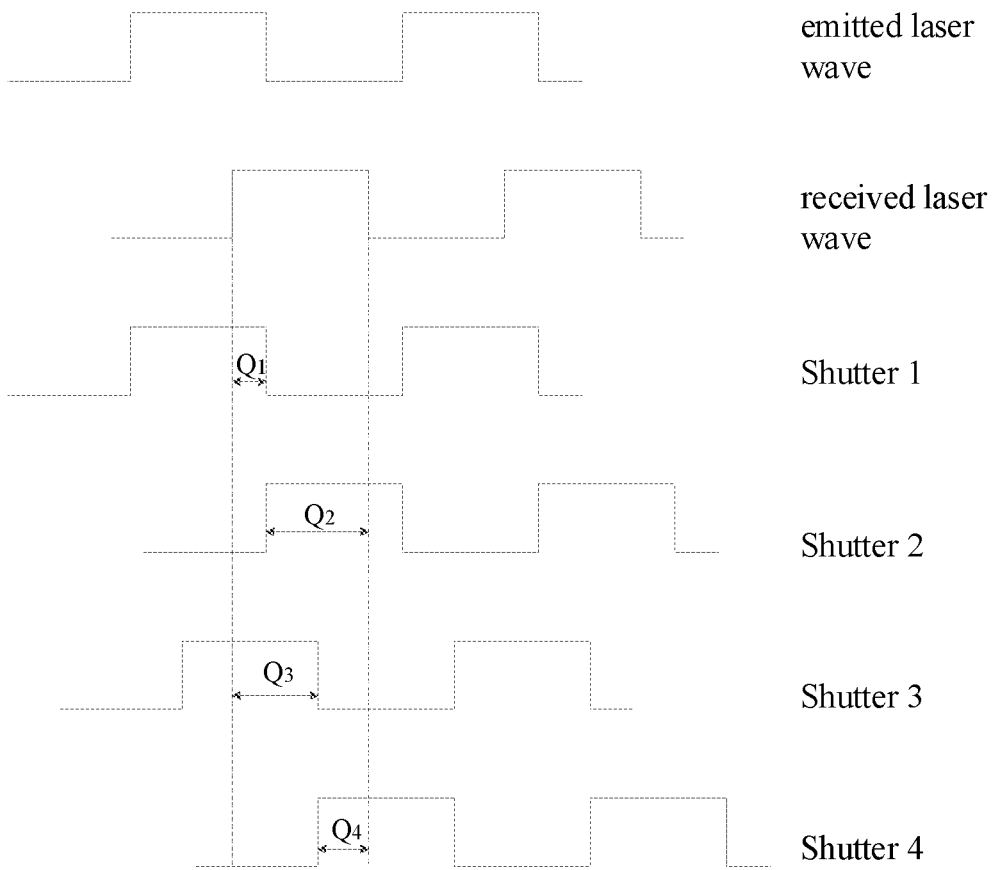

FIG. 4

Acquiring flag information corresponding to each second image, wherein the flag information is configured to represent a sequence in which the second images are captured — 502

Judging whether a captured second image is lost according to the flag information, and if not, packaging the second images and the corresponding flag information — 504

Sending the packaged second images to the second buffer — 506

FIG. 5

IMAGE PROCESSING METHOD, ELECTRONIC APPARATUS, AND COMPUTER-READABLE STORAGE MEDIUM

CROSS-REFERENCE TO RELATED APPLICATION(S)

This application claims priority to Chinese Patent Application No. 201810961959.X, filed on Aug. 22, 2018, the content of which is herein incorporated by reference in its entirety.

TECHNICAL FIELD

The present disclosure relates to the technical field of computers, particularly to an image processing method and device, an electronic apparatus, and a computer-readable storage medium.

BACKGROUND

When an intelligent apparatus takes an image of an object, the intelligent apparatus can capture not only color information of the object, but also the object's depth information. The color information of the image can be more accurately processed through the depth information. For example, it is possible to identify a near view and a distant view in the image according to the depth information, thereby processing colors of the near view and the distant view in different ways; and it is also possible to determine whether an identified human face is living according to the depth information, thereby performing beautifying processing on the living human face. There are a number of methods for capturing depth information via image processing manners, such as binocular ranging method, structured light method, time-of-flight method, etc.

SUMMARY

An image processing method includes: acquiring a first image captured by a first camera, and determining a first timestamp according to the first image, wherein the first timestamp is configured to represent a time point on which the first image is captured; acquiring at least two second images captured by a second camera, and determining a second timestamp according to the at least two second images; and processing the first image and the at least two second images when a time interval between the first timestamp and the second timestamp is smaller than a first interval threshold.

An electronic apparatus includes a non-transitory memory and a processor, wherein the non-transitory memory stores a computer program which, when executed by the processor, causes the processor to perform an image processing method. The method includes: acquiring a first image captured by a first camera, and determining a first timestamp according to the first image, wherein the first timestamp is configured to represent a time point on which the first image is captured; acquiring at least two second images captured by a second camera, and determining a second timestamp according to the at least two second images; and processing the first image and the at least two second images when a time interval between the first timestamp and the second timestamp is smaller than a first interval threshold.

A non-transitory computer-readable storage medium has a computer program stored thereon, wherein the computer program, when executed by a processor, implements an image processing method. The method includes: acquiring a first image captured by a first camera, and determining a first timestamp according to the first image, wherein the first timestamp is configured to represent a time point on which the first image is captured; acquiring at least two second images captured by a second camera, and determining a second timestamp according to the at least two second images; and processing the first image and the at least two second images when a time interval between the first timestamp and the second timestamp is smaller than a first interval threshold.

BRIEF DESCRIPTION OF DRAWINGS

In order to describe the technical solutions in the embodiments of the present disclosure or a related art more clearly, the drawings required to be used in descriptions about the embodiments or the related art will be simply introduced below. It is apparent that the drawings described below are only some embodiments of the present disclosure. Other drawings may further be obtained by those of ordinary skilled in the art according to these drawings without creative work.

FIG. 4 is a principle diagram of calculating depth information by TOF in an embodiment.

FIG. 5 is a flow diagram of an image processing method in still another embodiment.

DETAILED DESCRIPTION

Figure 1:
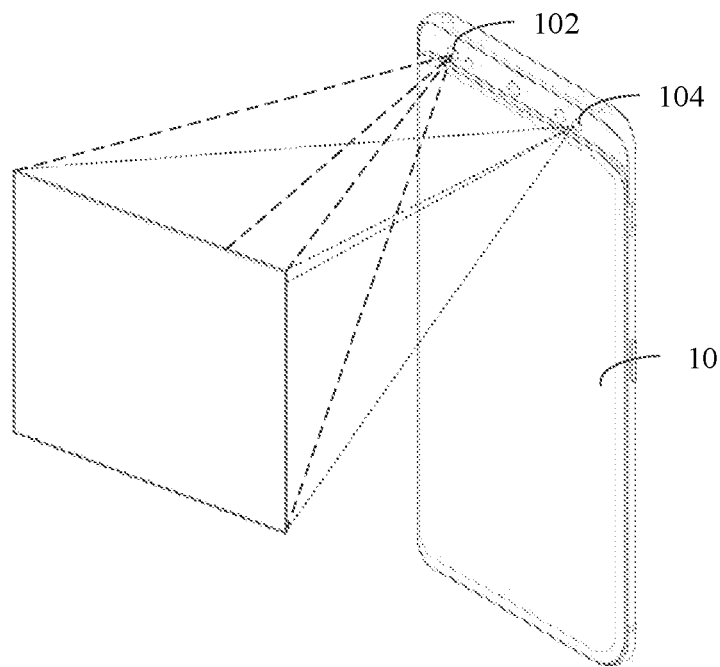
FIG. 1 is a diagram of applicable environment of an image processing method in an embodiment.

For making purposes, technical solutions and advantages of the present disclosure clearer, the present disclosure will further be described below in combination with the drawings and the embodiments in detail. It should be understood that specific embodiments described herein are only adopted to explain the present disclosure and not intended to limit the present disclosure.

It can be understood that, terms "first", "second", and the like used in the disclosure may be configured in the disclosure to describe various components but are not intended to limit these components. These terms are only adopted to distinguish a first component from another component. For example, without departing from the scope of the disclosure, a first camera may be called a second camera. Similarly, the second camera may be called the first camera. The first camera and the second camera may both be clients but are not the same client.

The present disclosure relates to an image processing method. The image processing method includes: acquiring a first image captured by a first camera, and determining a first timestamp according to the first image, wherein the first timestamp is configured to represent a time point on which the first image is captured; acquiring at least two second images captured by a second camera, and determining a second timestamp according to the at least two second images; and processing the first image and the at least two second images when a time interval between the first timestamp and the second timestamp is smaller than a first interval threshold.

In an embodiment, a time interval between capturing time points of any two of the captured second images is smaller than a second interval threshold; and wherein said determining a second timestamp according to the at least two second images includes: acquiring a capturing time point of any one of the at least two second images as the second timestamp; or acquiring an average value of corresponding capturing time points of the respective second images as the second timestamp.

In an embodiment, the first camera and the second camera are mounted in an electronic apparatus; and wherein the method further includes: when the electronic apparatus is shaken in the process of acquiring the first and second images, acquiring target jitter data of the electronic apparatus; and searching for a first interval threshold corresponding to the target jitter data from a pre-established correspondence relation between jitter data and first interval thresholds, when the target jitter data is smaller than a jitter threshold.

In an embodiment, said acquiring target jitter data of the electronic apparatus includes: acquiring jitter data one time every preset time length in the process of acquiring the first image and the second images; and seeking an average value of the acquired jitter data to obtain target jitter data.

In an embodiment, prior to said processing the first image and the at least two second images when a time interval between the first timestamp and the second timestamp is smaller than a first interval threshold, the method further includes: sending the first image to a first buffer and sending the at least two second images to a second buffer; and wherein said processing the first image and the at least two second images when the time interval between the first timestamp and the second timestamp is smaller than the first interval threshold includes: when the time interval between the first timestamp and the second timestamp is smaller than the first interval threshold, reading the first image in the first buffer and performing first-format conversion of the first image to generate a first target image; reading the second images in the second buffer, and performing second-format conversion of the at least two second images to generate a second target image, wherein the second target image is configured to represent depth information corresponding to the first target image; and processing the first target image and the second target image.

In an embodiment, said sending the at least two second images to a second buffer includes: acquiring flag information corresponding to each of the second images, wherein the flag information is configured to represent a sequence of capturing the second images; judging whether a captured second image is lost according to the flag information, and if not, packaging the second images and the corresponding flag information; and sending the packaged second images to the second buffer.

In an embodiment, said processing the first target image and the second target image includes: identifying a target object in the first target image, and acquiring target depth information corresponding to the target object according to the second target image; and processing the target object according to the target depth information.

In an embodiment, prior to said identifying a target object in the first target image, and acquiring target depth information corresponding to the target object according to the second target image, the method further comprises: packaging the first target image and the second target image; and sending the packaged first target image and second target image to an application mounted in an electronic apparatus.

An embodiment of the present disclosure provides an image processing device. The image processing device includes: a first image capturing module configured to acquire a first image captured by a first camera and to determine a first timestamp according to the first image, wherein the first timestamp is configured to represent a time point on which the first image is captured; a second image capturing module configured to acquire at least two second images captured by a second camera and to determine a second timestamp according to the at least two second images; and an image processing module configured to process the first image and the at least two second images when a time interval between the first timestamp and the second timestamp is smaller than a first interval threshold.

An embodiment of the present disclosure provides an electronic apparatus. The electronic apparatus includes a memory and a processor, wherein the memory stores a computer program which, when executed by the processor, causes the processor to perform any one of the methods described above.

An embodiment of the present disclosure provides a computer-readable storage medium. The computer-readable storage medium has a computer program stored thereon, wherein the computer program, when executed by a processor, implements any one of the methods described above.

An embodiment of the present disclosure provides an electronic apparatus. The electronic apparatus includes a non-transitory memory and a processor, wherein the non-transitory memory stores a computer program which, when executed by the processor, causes the processor to perform any one of the methods described above.

An embodiment of the present disclosure provides a non-transitory computer-readable storage medium. The non-transitory computer-readable storage medium has a computer program stored thereon, wherein the computer program, when executed by a processor, implements any one of the methods described above.

FIG. 1 is a diagram of applicable environment of an image processing method in an embodiment. As shown in FIG. 1, two cameras can be mounted on an electronic apparatus 10, which include a first camera 102 and a second camera 104. The electronic apparatus 10 may perform shooting by using the first camera 102 and the second camera 104. The electronic apparatus 10 may acquire a first image captured by the first camera 102, and may assign a corresponding first timestamp to the first image. The first timestamp may be configured to represent a time point on which the first image is captured. The electronic apparatus 10 may acquire at least two second images captured by the second camera 104, and may assign a corresponding second timestamp to the at least two second images. The second timestamp may be configured to represent a time point on which the at least two second images are captured. The first image and the at least two second images are processed when a time interval between the first timestamp and the second timestamp is smaller than a first interval threshold. A first image captured by the first camera 102 according to a first frame rate within a period of exposure is acquired, and at least two second images captured by the second camera 104 according to a second frame rate within the period of exposure is acquired. The first frame rate is smaller than the second frame rate. Then, a first target image is generated according to the first image, and a second target image is generated according to the second images, wherein the second target image is configured to represent depth information corresponding to the first target image; and processing the first target image and the second target image. It can be understood that, the electronic apparatus 10 may be a mobile phone, a computer, a wearable device, or the like, which is not limited herein.

Figure 2:
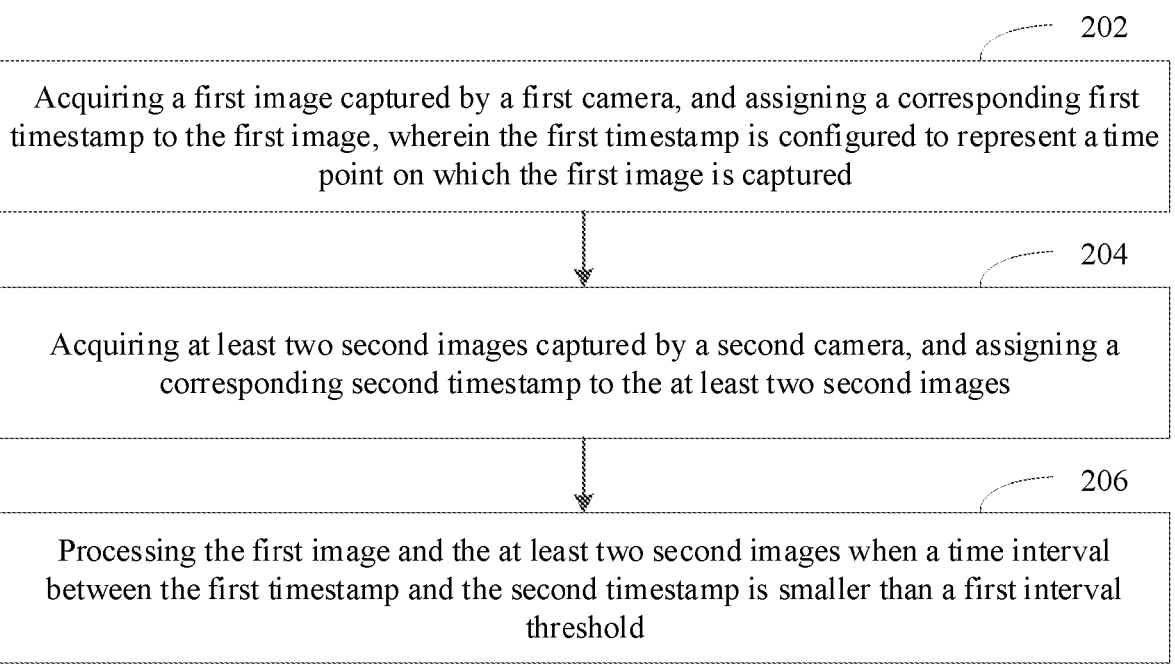
FIG. 2 is a flow diagram of an image processing method in an embodiment.

FIG. 2 is a flow diagram of an image processing method in an embodiment. As shown in FIG. 2, the image processing method includes blocks 202 to 206.

Block 202: Acquiring a first image captured by a first camera, and assigning a corresponding first timestamp to the first image, wherein the first timestamp is configured to represent a time point on which the first image is captured.

A camera can be mounted on the electronic apparatus and images are acquired through the mounted camera. The camera can be a laser camera, a visible light camera, and the like according to differences in acquired images. The laser camera can acquire images formed by irradiation of laser onto the object, and the visible light camera can acquire images formed by irradiation of visible light onto the object. Several cameras can be mounted on the electronic apparatus, and the mounted locations are not limited. In the embodiments of the present disclosure, at least two cameras are mounted on the electronic apparatus, which include a first camera and a second camera. The first camera and the second camera can simultaneously capture images for a same scene.

In one embodiment of the present disclosure, a camera can be mounted on a front panel of the electronic apparatus, and two cameras can be mounted on a back panel. Cameras can also be mounted in an interior of the electronic apparatus in an embedded manner, and can be turned on in a rotating or sliding manner. In one embodiment, a front camera and a rear camera can be mounted on the electronic apparatus, and can acquire images from different viewing angles. Generally, the front camera can acquire images from a front view angle of the electronic apparatus, and the rear camera can acquire images from a back viewing angle of the electronic apparatus.

When the first camera acquires a first image, a first timestamp according to the first image may be determined. The determined first timestamp may be stored in a manner of corresponding to the first image, and a time point on which the first image is captured may be acquired according to the first timestamp. In one embodiment, when the first camera captures the first image, the electronic apparatus reads a current time point and determines the first timestamp according to the current time point.

Block 204: Acquiring at least two second images captured by a second camera, and assigning a corresponding second timestamp to the at least two second images.

The second camera can capture at least two second images. The at least two second images captured can be synthesized into one image, and the synthesized image is processed. In one embodiment, three second images may be captured and are then synthesized into one last image; or four second images may be captured and are then synthesized into one last image.

When the second images are captured, a second timestamp can be determined and is stored in a manner of corresponding to the second images. It can be understood that the second images captured by the second camera are generated frame by frame, and thus, in the process of capturing the second images, the electronic apparatus can read a time point when one frame of the second images is captured at a time. A second timestamp can be determined according to a time point at which any one of the second images is captured, for example, a time point at which the first second image is captured. It is also possible to seek an average value of time points at which all the second images are captured, and a second timestamp is determined according to the average value obtained, which is not limited herein.

Block 206: Processing the first image and the at least two second images when a time interval between the first timestamp and the second timestamp is smaller than a first interval threshold.

It can be understood that, the first camera and the second camera may perform shooting for a same scene, so the first image and the second images obtained by the shooting correspond to each other. Since the electronic apparatus may be shaken in the process of acquiring the first image and the second images, it is necessary to simultaneously capture the first image and the second images in order to ensure correspondence between the first image and the second images. When the time interval between the first timestamp and the second timestamp is smaller than the first interval threshold, the first image and the second images are considered to be acquired for the same scene, and thus, processing can be performed based on the first image and the second images. When the time interval between the first timestamp and the second timestamp is larger than the first interval threshold, the first image and the second images are not considered to be acquired for the same scene, and the acquired first image and second images may be directly discarded.

When the first image and the second images are acquired, processing of the first image and the second images is not limited herein. In one embodiment, the first image and the second images may be images in RAW format. The first image in the RAW format may be converted into an image in RGB format, and the second images in the RAW format may be converted into an image in Depth format. The converted first image and second images are then sent to an application for three-dimensional modeling, beautifying, and the like.

According to the image processing method provided by the above embodiments, a corresponding first timestamp of a first image is determined when a first camera captures the first image. When a second camera captures second images, a corresponding second timestamp of the second images is determined. Prior to processing the first image and the second images, a time interval between the first timestamp and the second timestamp is judged. The first image and the second images are processed when the time interval between the first timestamp and the second timestamp is smaller than a first interval threshold. In this way, it can be ensured that the captured first image and second images correspond to each other, thereby avoiding errors caused by capturing the images in the case of a great time difference and improving accuracy of image processing.

Figure 3:
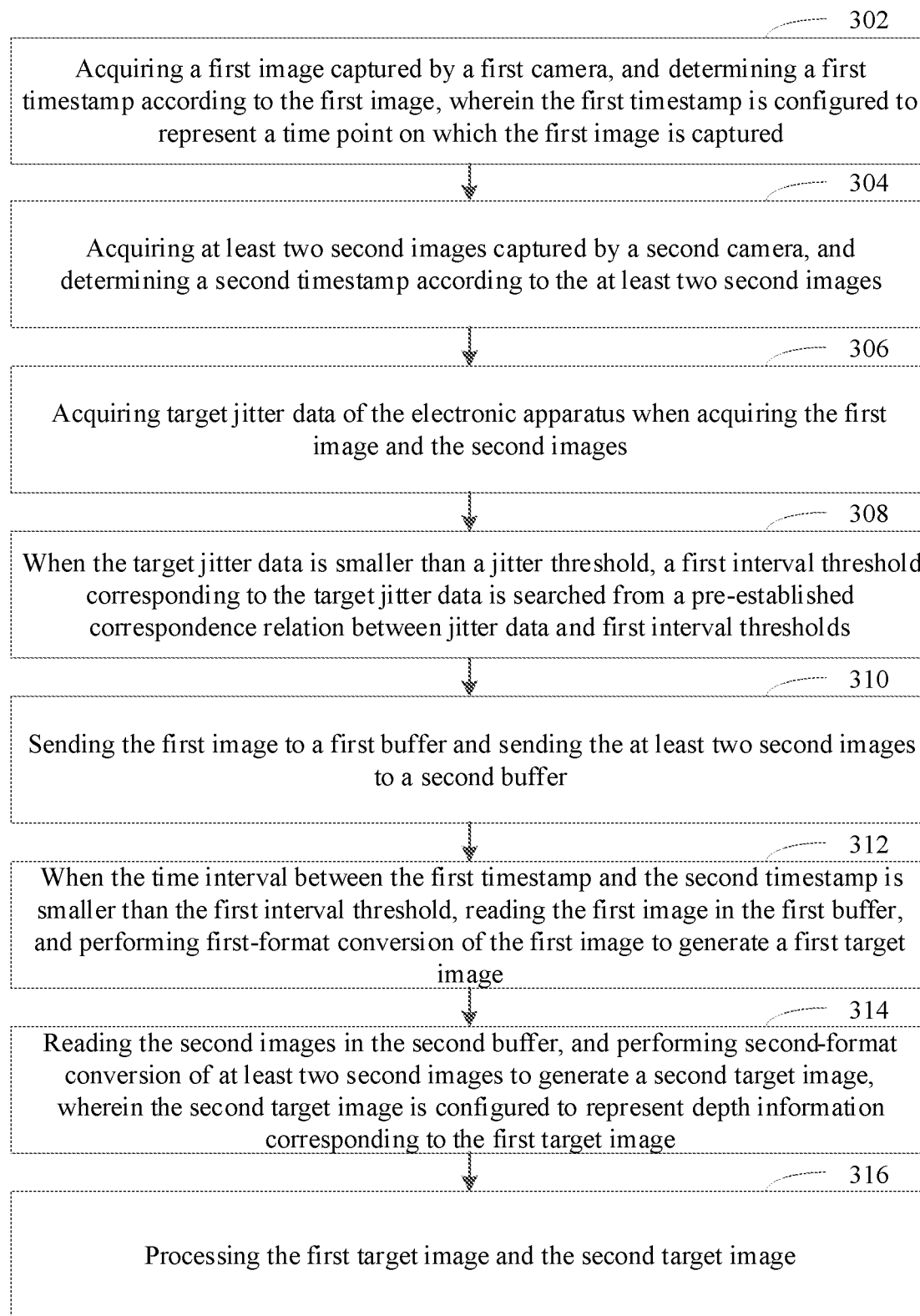
FIG. 3 is a flow diagram of an image processing method in another embodiment.

FIG. 3 is a flow diagram of an image processing method in another embodiment. As shown in FIG. 3, the image processing method includes blocks 302 to 316.

Block 302: Acquiring a first image captured by a first camera, and determining a first timestamp according to the first image, wherein the first timestamp is configured to represent a time point on which the first image is captured.

In an embodiment, an application (APP) may be mounted in the electronic apparatus, and may initiate an image-capturing instruction that triggers the camera to capture images. For example, when it is needed to take an image, a user will open a camera APP, and then initiate an image-capturing instruction by pressing a "shooting" button of the camera APP; and when the electronic apparatus has detected the image-capturing instruction, images captured by the camera are acquired. When the image-capturing instruction has been detected, the block 302 may be performed.

Block 304: Acquiring at least two second images captured by a second camera, and determining a second timestamp according to the at least two second images.

In an embodiment, in order to ensure consistency of the captured images, it is necessary to ensure that the first camera and the second camera capture images of a same shooting scene, and that a plurality of second images captured by the second camera are images of a same scene. Therefore, when the second camera captures a plurality of second images, the electronic apparatus may control a time interval between capturing time points of any two second images captured by the second camera to be smaller than a second interval threshold. The second interval threshold is a relatively small value. The first interval threshold and the second interval threshold can be identical, and can also be different, which is not limited herein.

Second images captured by the second camera include at least two. For example, four second images, eight second images, nine second images, or the like can be captured. When the second camera generates a frame of second image, the electronic apparatus will read a time point of generating the second image, and then determine a corresponding second timestamp according to the read time point of the second image. A capturing time point of any one of at least two second images can be acquired as a second timestamp according to the at least two second images; or an average value of corresponding capturing time points of the respective second images is acquired as a second timestamp according to the at least two second images.

For example, capturing time points of five second images captured by the second camera are represented by "minute:second:millisecond" as "14:25:256"→"14:25:364"→"14:25:485"→"14:25:569"→"14:25:691", respectively. Thus, the second timestamp may be determined according to a capturing time point of the acquired first second image, i.e., "14:25:256", may also be determined according to a capturing time point of the third second image, i.e., "14:25:485", and may also be determined according to an average value of capturing time points of the acquired five second images, i.e., "14:25:473", which is not limited herein.

In an embodiment, since the first camera and the second camera are mounted at different positions of the electronic apparatus, acquired first image and second images may generate some parallax. Therefore, when the first image and the second images are acquired, the acquired first image and second images may be subjected into alignment processing, so that the acquired first image and second images correspond to each other, i.e., correspond to a same scene.

Block 306: Acquiring target jitter data of the electronic apparatus when acquiring the first image and the second images.

Jitter data can be data read by one or more sensors such as a gyroscope, an acceleration sensor, and a Hall sensor, and is not limited herein. The gyroscope can detect angular velocity of rotation of the electronic apparatus; the Hall sensor can detect physical quantity of the electronic apparatus, such as a tilt angle, displacement, and angular velocity; and the acceleration sensor can detect acceleration of the electronic apparatus in motion. It is possible to determine jitter conditions of the electronic apparatus according to data acquired by the above sensors.

It should be noted that, both the first camera and the second camera are mounted on the electronic apparatus, and in the process of capturing the first image and the second images, target jitter data indicative of jitter conditions of the electronic apparatus may be acquired. In one embodiment, jitter data can be read one time at the start of capturing images, or jitter data is read one time when the images have been captured, and jitter data can be captured multiple times and is then averaged.

In one embodiment, blocks of acquiring target jitter data include: acquiring jitter data one time every preset time length in the process of acquiring the first image and the second images, and then seeking an average value of the acquired jitter data to obtain the target jitter data. The process of acquiring the first image and the second images refers to a process that starts when first capturing of the first image or the second images is detected and ends when capturing of all the first and second images is completed. In one embodiment, jitter data of the electronic apparatus is read one time at an interval of 100 milliseconds in the process of capturing the first image and the second images, and then the read jitter data is averaged to obtain the target jitter data.

Block 308: When the target jitter data is smaller than a jitter threshold, a first interval threshold corresponding to the target jitter data is searched from a pre-established correspondence relation between jitter data and first interval thresholds.

If the electronic apparatus is shaken in the process of acquiring the first image and the second images, it is shown that the captured first image and second images are more likely to have an error. Target jitter data of the electronic apparatus is acquired, and is compared with a jitter threshold. When the target jitter data is greater than the jitter threshold, an error of the first image and the second images captured by the electronic apparatus is considered relatively great, and the captured first image and second images can be directly discarded. When the target jitter data is smaller than the jitter threshold, the error of the first image and the second images captured by the electronic apparatus is considered relatively small, and thus, it is possible to judge whether the first image and the second images are available according to the capturing time points, and it is also possible to acquire a corresponding first interval threshold according to the target jitter data.

Block 310: Sending the first image to a first buffer and sending the at least two second images to a second buffer.

The first camera is connected to a first buffer, and the second camera is connected to a second buffer. When the first camera captures the first image, the first image is sent to the first buffer. When the second camera captures the second images, the captured second images are sent to the second buffer. It can be understood that, the first image and the second images are stored in the first buffer and the second buffer respectively, and when capturing of the first image and the second images is completed, the first image and the second images are further read from the first buffer and the second buffer respectively. As such, synchronization of the first image and the second images can be achieved.

In one embodiment, before at least two second images are sent to the second buffer, the second images can be packaged. As such, it can be ensured that the at least two second images acquired may be transmitted as a whole, and the transmission process will not involve frame dropping.

Block 312: When the time interval between the first timestamp and the second timestamp is smaller than the first interval threshold, reading the first image in the first buffer, and performing first-format conversion of the first image to generate a first target image.

In one embodiment, the time interval between the corresponding first timestamp of the first image and the corresponding second timestamp of the second images is acquired. When the obtained time interval is smaller than the first interval threshold, the first image may be read from the first buffer, and the second images can be read from the second buffer, and processing is then performed based on the read first image and second images.

It can be understood that a camera is composed of an optical element and an image sensor. The optical element is configured to collect light rays. The image sensor includes a color filter array (e.g., a Bayer filter) and can be configured to convert light intensity and wavelength information of the light rays collected by the optical element into an electrical signal and then to generate an initial image. The first image is an initial image captured by the first camera, and the first initial image is subjected into first-format conversion thereby to generate the first target image.

In the embodiments provided by the present disclosure, the first camera can be a visible light camera; and the second camera can be a laser camera and correspondingly has a laser emitter. The laser emitter can emit a laser wave. The laser wave is reflected by an object and then captured by the second camera to obtain a second image. Through the captured second image, it is possible to calculate depth information of the object. The first image can be an image in RAW format; the first target image can be an image in YUV format; and the first image in the RAW format is subjected into first-format conversion thereby to obtain a first target image in YUV format.

Block 314: Reading the second images in the second buffer, and performing second-format conversion of at least two second images to generate a second target image, wherein the second target image is configured to represent depth information corresponding to the first target image.

The second image captured by the second camera is also an initial image, and only after some format conversion, a final target image can be obtained. In one embodiment, the second camera can be a laser camera. The electronic apparatus can be further equipped with a laser emitter which emits a laser wave at a certain frequency. The second camera is configured to capture an image formed in a manner that the laser wave is reflected by the object. Then, by calculating Time of Flight (TOF) of the laser wave, it is possible to calculate a distance from the object to the second camera.

In an embodiment, the laser emitter can be controlled to emit laser waves; at least two shutters of the second camera are controlled to be on and off, and then at least two second images generated by reflection of the laser waves when the shutter is on are acquired. The second camera can capture different second images through different shutters. The captured second images may also be images in RAW format, and the second target image may be an image in Depth format. The second images in the RAW format are subjected into second-format conversion to obtain a second target image in Depth format.

FIG. 4 is a principle diagram of calculating depth information by TOF in an embodiment. As shown in FIG. 4, the laser emitter can emit a laser wave; the emitted laser wave is reflected by an object to form a reflected laser wave; and depth information of the object can be calculated according to a phase difference between the emitted laser wave and the received laser wave. When the laser camera actually captures images, different shutters can be controlled to be on and off at different time points, and different received signals are then formed, so that different images are captured through multiple shutter switches to calculate a depth image. In an embodiment, assuming the laser camera controls receiving of laser wave signals through four shutters, and the laser wave signals received by Shutter 1, Shutter 2, Shutter 3, and Shutter 4 are $Q_1$, $Q_2$, $Q_3$, and $Q_4$, respectively. Thus, a formula for calculating depth information is as follows:

$$D = \frac{c}{4\pi f}\tan^{-1}\frac{(Q_3 - Q_4)}{(Q_1 - Q_2)}.$$

C is a speed of light, and f is an emission frequency of laser waves. Through the above formula, it is possible to perform second-format conversion of four second images to generate a corresponding second target image in Depth format. It can be understood that, when the acquired second images are differ in image numbers, corresponding formulae for performing second-format conversion of the second images may also be different. In one embodiment, a corresponding second-format conversion formula may be acquired according to the number of the second images, and the second images are subjected into second-format conversion according to the second-format conversion formula.

Block 316: Processing the first target image and the second target image.

In one embodiment, the first camera and the second camera perform shooting for a same scene, so the first image and the second image obtained by the shooting correspond to each other, and the obtained first target image and second target image also correspond to each other. In one embodiment, the first target image is a YUV image, and the second target image is a Depth image. Thus, the first target image may represent color information of the shooting scene, and the second target image may represent corresponding depth information of the shooting scene.

When the first target image and the second target image are acquired, the first target image and the second target image can be processed, and specific processing manner is not limited. In one embodiment, human face recognition processing may be performed according to the first target image, and the human face recognized in the first target image is subjected into three-dimensional modeling according to the second target image to obtain a three-dimensional model of the human face. It is also possible to perform beautifying processing on the human face in the first target image according to the depth information in the second target image.

As shown in FIG. 5, in an embodiment, sending the second images to the second buffer may include the following.

Block 502: Acquiring flag information corresponding to each second image, wherein the flag information is configured to represent a sequence in which the second images are captured.

There are at least two second images captured by the second camera. Therefore, when the second camera captures the second images, corresponding flag information is generated for each of the second images, and is configured to mark a sequence of image capturing. The flag information may be, but is not limited to, capturing time points of the second images, phases of the second images, and the like. The capturing time points of the second images are configured to represent time points at which the second images are captured, and according to the capturing time points, it is possible to judge a time sequence in which the second images are captured. The phases of the second images may represent a sequence of each frame of the second images captured. In one embodiment, the second images may be marked with serial numbers as "01", "02", "03" and "04" according to the sequence of the capturing time points.

Block 504: Judging whether a captured second image is lost according to the flag information, and if not, packaging the second images and the corresponding flag information.

According to the above flag information, it is possible to judge whether the captured second image is lost. If yes, the currently captured second images can be discarded; and if not, the second images and the corresponding flag information are packaged. For example, if the serial numbers of the captured second images are "01", "03", and "04", it is shown that a second image with a serial number of "02" is lost therein.

Block 506: Sending the packaged second images to the second buffer.

Because the packaged second images are transmitted as a whole, there is no loss of one frame or several frames during the transmission process. There will only be a case where all of the second images are present, or a case where all of the second images are discarded. When the second images and the flag information are packaged, the packaged second images can be sent to the second buffer. A sequence of capturing the second images may be judged according to the flag information, and then the second images are packaged according to the sequence of acquiring the second images.

Figure 6:
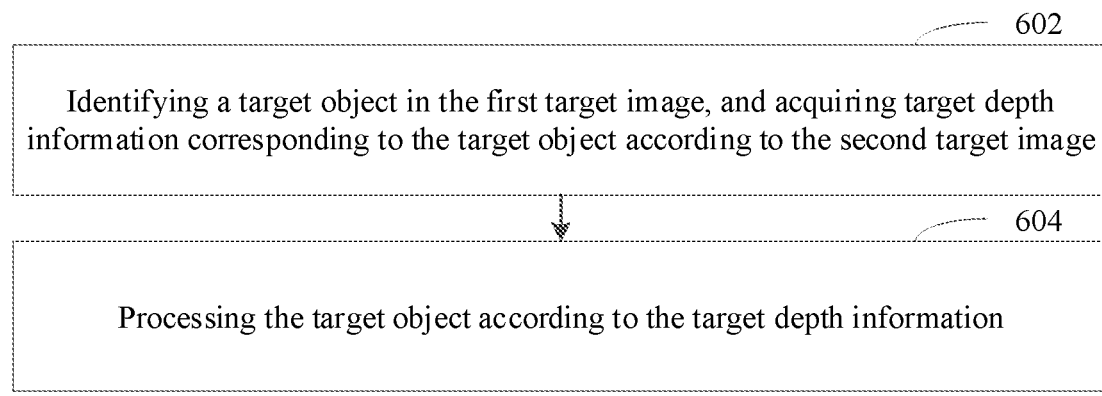
FIG. 6 is a flow diagram of an image processing method in still another embodiment.

As shown in FIG. 6, in an embodiment, the block of processing a first target image and a second target image may include the following.

Block 602: Identifying a target object in the first target image, and acquiring target depth information corresponding to the target object according to the second target image.

When the first target image and the second target image are acquired, the first target image and the second target image may be subjected into packaging processing, and then the first target image and the second target image are sent to an application mounted in an electronic apparatus to prevent loss of image data. In one embodiment, the first target image is an RGB (Red Green Blue) image, and the second target image is a Depth image. Thus, the first target image and the second target image may be packaged into RGBD images and then sent to the application.

When the application receives the first target image and the second target image, the target object in the first target image may be identified. The second target image may represent depth information corresponding to the first target image. Thus, it is possible to acquire target depth information corresponding to the target object in the first target image according to the second target image. The identified target object in the first target image may be a target area composed of a plurality of pixel points. According to the target area, a corresponding target depth area in the second target image may be located, and according to the target depth area, corresponding depth information of each pixel in the target area may be acquired.

In the embodiments provided by the present disclosure, a method of identifying the target object is not limited herein. In one embodiment, the target object can be a human face, and thus, a human face in the first target image can be identified via a human face detection algorithm. The target object can also be a building, a plant, an animal, or the like, which can be identified by means of artificial intelligence.

Block 604: Processing the target object according to the target depth information.

When the target depth information corresponding to the target object is acquired, the target object may be processed according to the target depth information. In one embodiment, the target object may be subjected into three-dimensional modeling according to the target depth information, and may be also be subjected into beautifying processing according to the target depth information. The specific processing manners are not limited herein.

Figure 7:
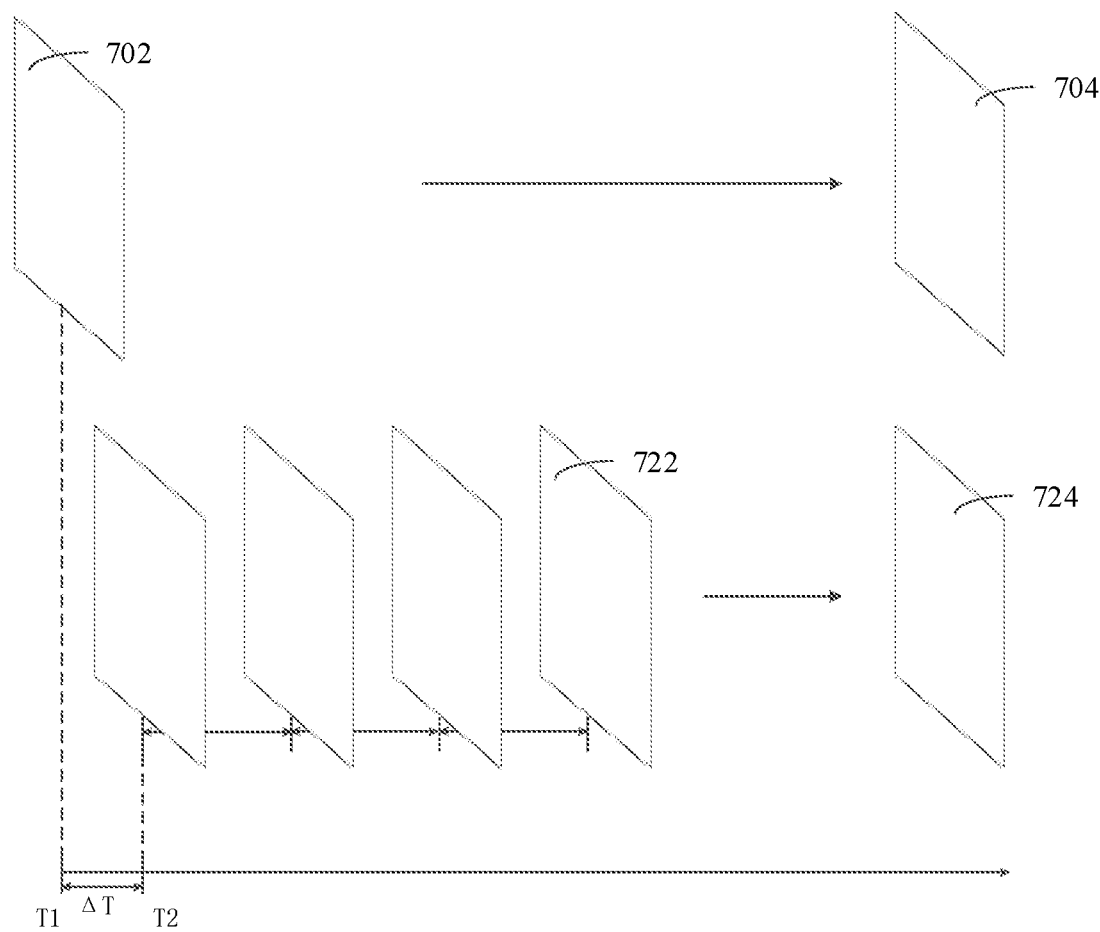
FIG. 7 is a schematic diagram of image processing flow in an embodiment.

As shown in FIG. 7, a first camera may capture a first image 702, and a second camera may capture at least two second images 722. A first timestamp corresponding to the first image 702 is T1 and a corresponding second timestamp of the second images 722 is T2. A time interval between the first timestamp T1 and the second timestamp T2 is ΔT. When the time interval ΔT is smaller than a first interval threshold, a first target image 704 may be calculated according to the first image 702, and a second target image 724 may be calculated according to the second images 722. Finally, processing is further performed based on the obtained first target image 704 and second target image 724.

According to the image processing method provided by the above embodiments, a corresponding first timestamp of a first image is determined when a first camera captures the first image. When a second camera captures a second image, a corresponding second timestamp of the second image is determined. Prior to processing the first image and the second image, a time interval between the first timestamp and the second timestamp is judged. The first image and the second image are processed when the time interval between the first timestamp and the second timestamp is smaller than a first interval threshold. In this way, it can be ensured that the captured first image and second image correspond to each other, thereby avoiding errors caused by capturing the images in the case of a great time difference and improving accuracy of image processing.

It should be understood that, although the steps in the flow chart in FIGS. 2, 3, 5 and 6 are presented successively according to the arrows, these steps will not be successively performed necessarily in the order indicated by the arrows. Unless expressly stated by the present disclosure, these steps will not be limited to a strict order, but can be performed in any order. Furthermore, at least a part of the steps in FIGS. 2, 3, 5 and 6 may include multiple sub-steps or multiple stages. These sub-steps or stages will not necessarily be performed at the same time, but can be performed in different time. These sub-steps or stages will not necessarily be performed successively, but can be performed alternatively with other steps or at least a part of the sub-steps or stages of other steps.

Figure 8:
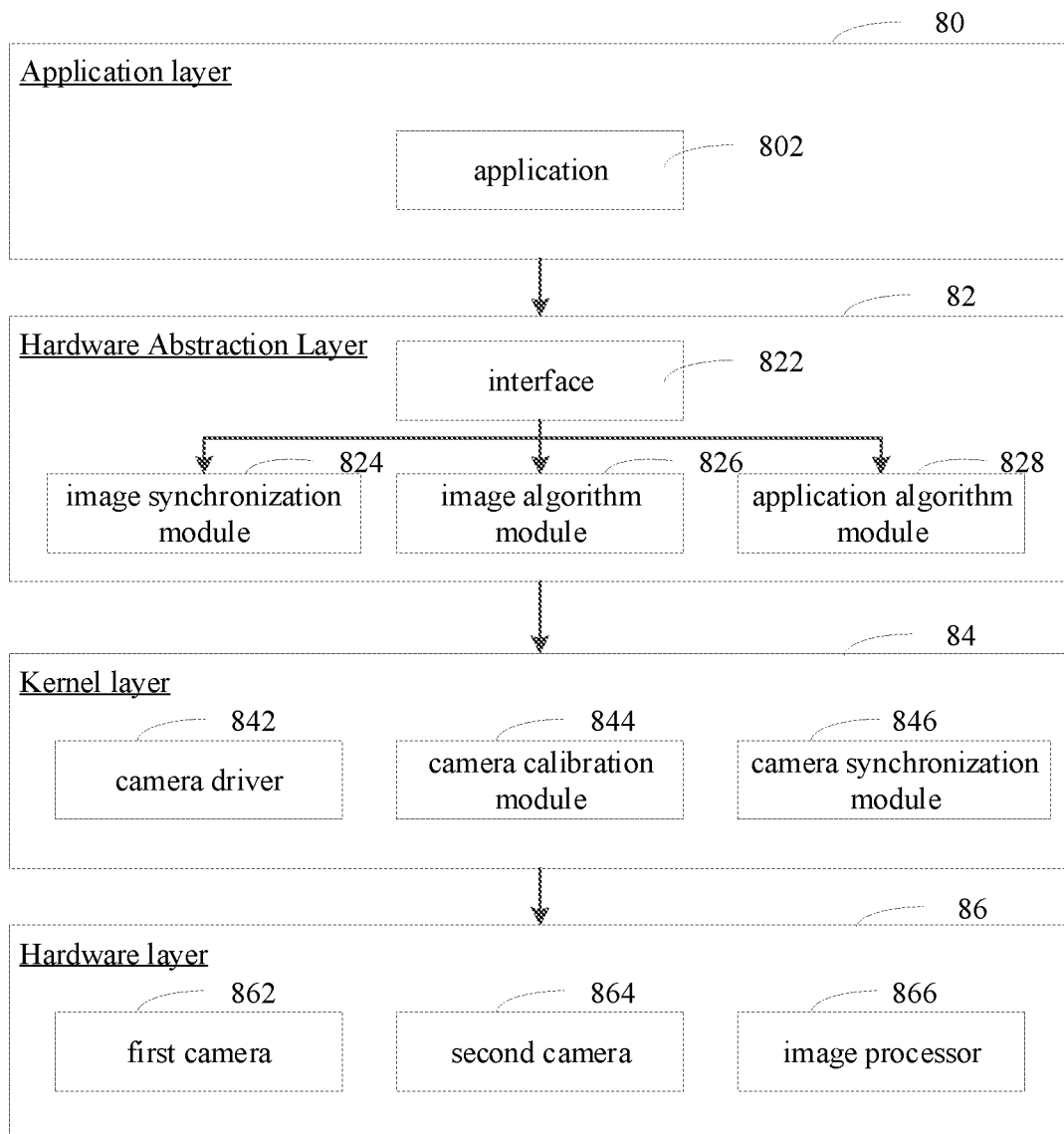
FIG. 8 is a software framework diagram of implementing an image processing method in an embodiment.

FIG. 8 is a software framework diagram of implementing an image processing method in an embodiment. As shown in FIG. 8, the software framework includes an Application layer 80, a Hardware Abstraction Layer (HAL) 82, a Kernel layer 84, and a Hardware layer 86. The Application layer 80 includes an application 802. The Hardware Abstraction Layer 82 includes an interface 822, an image synchronization module 824, an image algorithm module 826, and an application algorithm module 828. The Kernel layer 84 includes a camera driver 842, a camera calibration module 844, and a camera synchronization module 846. The Hardware layer 86 includes a first camera 862, a second camera 864, and an Image Signal Processor (ISP) 866.

In an embodiment, the application 802 can be used to initiate an image capturing instruction which is then sent to the interface 822. When the interface 822 parses the image capturing instruction, configuration parameters of the camera are defined by the camera driver 842. The configuration parameters are then sent to the image processor 866. The first camera 862 and the second camera 864 are controlled by the image processor 866 to be turned on. When the first camera 862 and the second camera 864 are turned on, the first camera 862 and the second camera 864 can be controlled by the camera synchronization module 846 to synchronously capture images. A first image captured by the first camera 862 and a second image captured by the second camera 864 are sent to the image processor 866, and then are sent to the camera calibration module 844 via the image processor 866. The camera calibration module 844 aligns the first image and the second image, and then transmits the aligned first and second images to the hardware abstraction layer 82. The image synchronization module 824 in the hardware abstraction layer 82 is configured to acquire a first timestamp of the first image and a second timestamp of the second image, and then to judge whether the first image and the second image are simultaneously acquired according to the first timestamp and the second timestamp. A time interval between the first timestamp and the second timestamp is smaller than a first interval threshold, and thus, the first image and the second image are determined to be acquired simultaneously, only whereby a first target image is calculated by the image algorithm module 826 according to the first image and a second target image is calculated according to the second image. The first target image and the second target image are packaged via the application algorithm module 828, and then the packaged first target image and second target image are sent to the application 802 through the interface 822. When the application 802 acquires the first target image and the second target image, three-dimensional modeling, beautifying, and augmented reality (AR) processing may be performed based on the first target image and the second target image.

Figure 9:
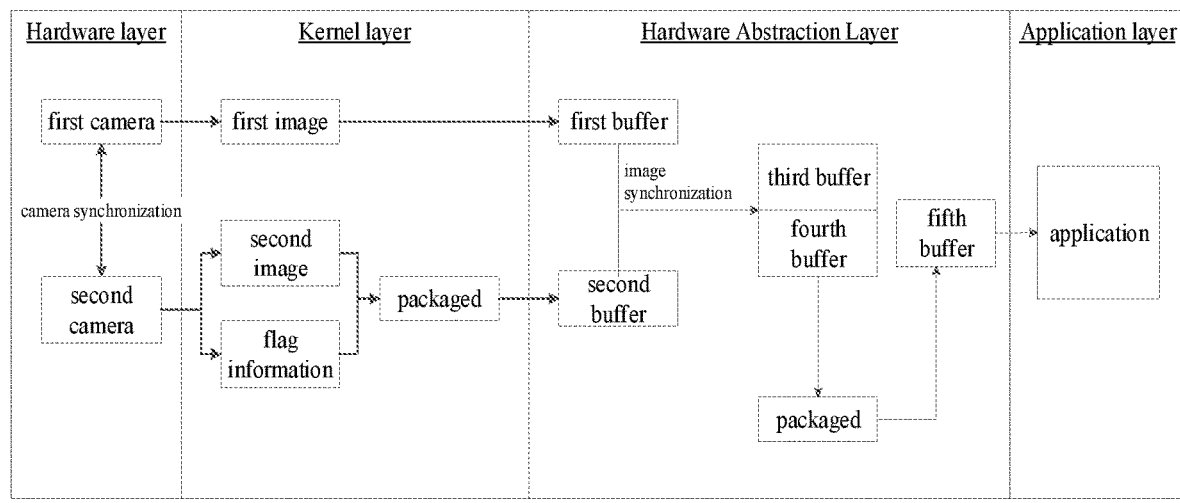
FIG. 9 is a schematic diagram of implementing an image processing method in an embodiment.

FIG. 9 is a schematic diagram of implementing an image processing method in an embodiment. As shown in FIG. 9, a first camera and a second camera need to be subjected into camera synchronization processing in the process of capturing images. A first image captured by the first camera may be sent together with a corresponding first timestamp to a first buffer. A second image captured by the second camera may be packaged together with corresponding flag information, and the packaged second image and flag information are sent together with a corresponding second timestamp to a second buffer. When a time interval between the first timestamp and the second timestamp is smaller than a first interval threshold, the first image in the first buffer is read and subjected into first-format conversion to obtain a first target image which is sent to a third buffer; and the second image and the corresponding flag information in the second buffer are read, and the second image is then subjected into second-format conversion to obtain a second target image which is sent to a fourth buffer. The first target image and the second target image, before being sent to an application, may be subjected into packaging processing, and then the packaged first target image and second target image are sent to a fifth buffer. The application may read the packaged first target image and second target image from the fifth buffer and perform subsequent processing according to the read first target image and second target image.

Figure 10:
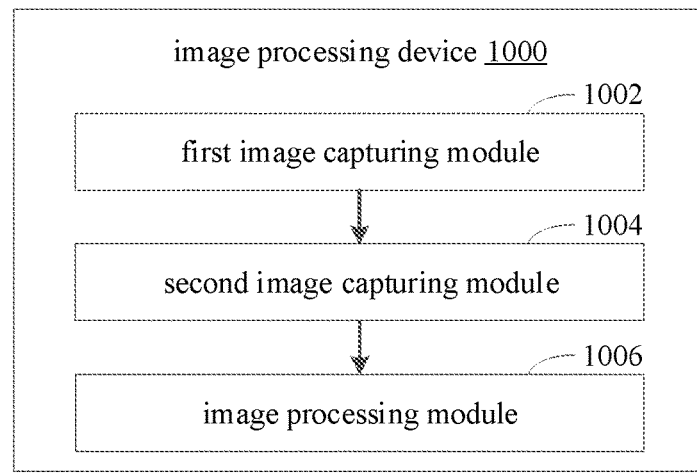
FIG. 10 is a structural diagram of an image processing device in an embodiment.

FIG. 10 is a structural diagram of an image processing device in an embodiment. As shown in FIG. 10, the image processing device 1000 includes a first image capturing module 1002, a second image capturing module 1004, and an image processing module 1006.

The first image capturing module 1002 is configured to acquire a first image captured by a first camera and to determine a first timestamp according to the first image, wherein the first timestamp is configured to represent a time point on which the first image is captured.

The second image capturing module 1004 is configured to acquire at least two second images captured by a second camera and to determine a second timestamp according to the at least two second images.

The image processing module 1006 is configured to process the first image and the at least two second images when a time interval between the first timestamp and the second timestamp is smaller than a first interval threshold.

According to the image processing device described above, a corresponding first timestamp of a first image is determined when a first camera captures the first image. When a second camera captures second images, a corresponding second timestamp of the second images is determined. Prior to processing the first image and the second images, a time interval between the first timestamp and the second timestamp is judged. The first image and the second image are processed when the time interval between the first timestamp and the second timestamp is smaller than a first interval threshold. In this way, it can be ensured that the captured first image and second images correspond to each other, thereby avoiding errors caused by capturing the images in the case of a great time difference and improving accuracy of image processing.

Figure 11:
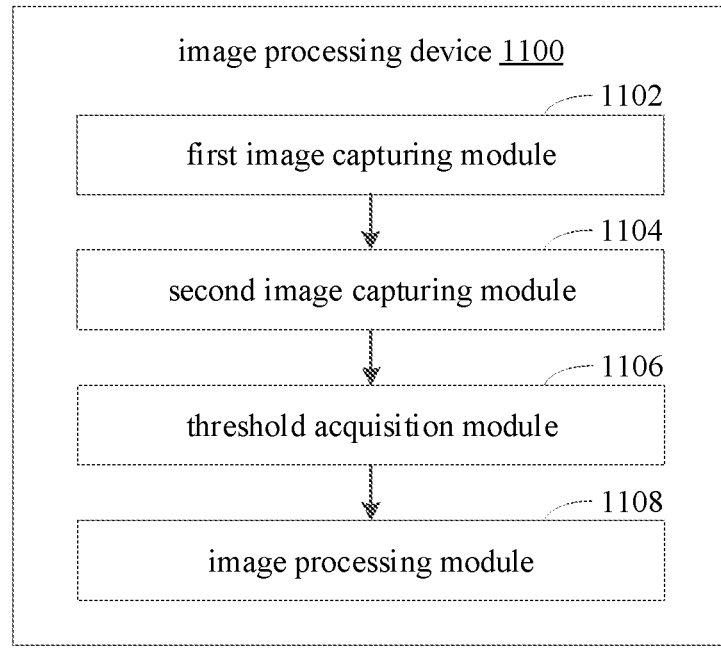
FIG. 11 is a structural diagram of an image processing device in another embodiment.

FIG. 11 is a structural diagram of an image processing device in another embodiment. As shown in FIG. 11, an image processing device 1100 includes a first image capturing module 1102, a second image capturing module 1104, and a threshold acquisition module 1106.

The first image capturing module 1102 is configured to acquire a first image captured by a first camera and to determine a first timestamp according to the first image, wherein the first timestamp is configured to represent a time point on which the first image is captured.

The second image capturing module 1104 is configured to acquire at least two second images captured by a second camera and to determine a second timestamp according to the at least two second images.

A threshold acquisition module 1106 is configured to acquire target jitter data when the electronic apparatus captures the first and second images. When the target jitter data is smaller than a jitter threshold, a first interval threshold corresponding to the target jitter data is searched from a pre-established correspondence relation between jitter data and first interval thresholds.

The image processing module 1108 is configured to process the first image and the at least two second images when a time interval between the first timestamp and the second timestamp is smaller than the first interval threshold.

According to the image processing device described above, the first image and the second images are processed when the time interval between the first timestamp and the second timestamp is smaller than a first interval threshold. In this way, it can be ensured that the captured first image and second images correspond to each other, thereby avoiding errors caused by capturing the images in the case of a great time difference and improving accuracy of image processing. At the same time, the first interval threshold can be adjusted according to the jitter condition of the electronic apparatus, which can ensure the accuracy of the acquired image and further improve the accuracy of image processing.

In an embodiment, a time interval between capturing time points of any two second images captured is smaller than a second interval threshold. The second image capturing module 1104 is further configured to acquire a capturing time point of any one of the at least two second images as the second timestamp according to the at least two second images, or acquire an average value of corresponding capturing time points of the respective second images as a second timestamp according to the at least two second images.

In an embodiment, the threshold acquisition module 1106 is further configured to acquire jitter data one time every preset time length in the process of acquiring the first image and the second images; and the acquired jitter data is averaged to obtain target jitter data.

In an embodiment, the image processing module 1108 is further configured to send the first image to a first buffer and to send the at least two second images to a second buffer. When the time interval between the first timestamp and the second timestamp is smaller than the first interval threshold, the first image in the first buffer is read and subjected into first-format conversion to generate a first target image. The second images in the second buffer are read and the at least two second images subjected into second-format conversion to generate a second target image which is configured to represent depth information corresponding to the first target image. The first target image and the second target image are processed.

In an embodiment, the image processing module 1108 is further configured to acquire flag information corresponding to each of the second images, wherein the flag information is configured to represent a sequence of capturing the second images; judge whether a captured second image is lost according to the flag information, and if not, package the second images and the corresponding flag information; and send the packaged second images to the second buffer.

In an embodiment, the image processing module 1108 is further configured to identify a target object in the first target image, and acquire target depth information corresponding to the target object according to the second target image; and process the target object according to the target depth information.

The division of each module in the above image processing device is for illustrative purposes only. In other embodiments, the image processing device may be divided into other modules different from the above modules, to complete the whole or some of functions of the image processing device.

For the specific definition of the image processing device, reference may be made to the definition of the image processing method in the above, and details are not described herein again. The various modules in the image processing device described above may be implemented in whole or in part by software, hardware, and combinations thereof. Each of the above modules may be embedded in or independent of the processor in the computer device, or may be stored in a memory in the computer device in a software form, so that the processor invokes the operations corresponding to the above modules.

The implementation of each module in the image processing device provided in the embodiments of the present disclosure may be in the form of a computer program. The computer program can run on a terminal or server. The program modules of the computer program can be stored on the memory of the terminal or server. When the computer program is executed by the processor, the steps of the method described in the embodiments of the present disclosure are implemented.

Figure 12:
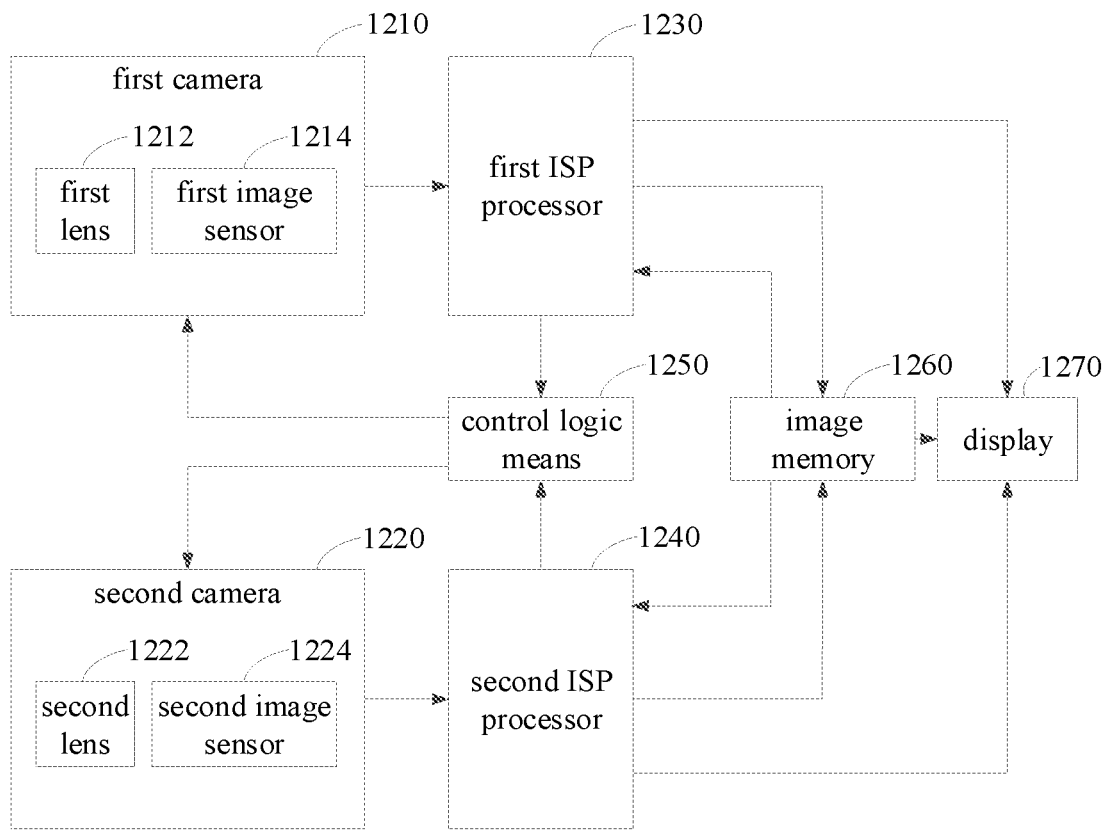
FIG. 12 is a schematic diagram of an image processing circuit in an embodiment.

An embodiment of the present disclosure further provides an electronic apparatus. The electronic apparatus includes an image processing circuit, which can be implemented by using hardware and/or software components and can include various processing units defining an ISP (Image Signal Processing) pipeline. FIG. 12 is a schematic diagram of an image processing circuit in an embodiment. As shown in FIG. 12, for the sake of illustration, only various aspects of the image processing technique related to the embodiments of the present disclosure are shown.

As shown in FIG. 12, the image processing circuit includes a first ISP processor 1230, a second ISP processor 1240, and a control logic means 1250. A first camera 1210 includes one or more first lenses 1212 and a first image sensor 1214. The first image sensor 1214 can include a color filter array (e.g., a Bayer filter). The first image sensor 1214 can acquire light intensity and wavelength information captured by each imaging pixel of the first image sensor 1214 and provide a set of image data which can be processed by the first ISP processor 1230. The second camera 1220 includes one or more second lenses 1222 and a second image sensor 1224. The second image sensor 1224 can include a color filter array (e.g., a Bayer filter). The second image sensor 1224 can acquire light intensity and wavelength information captured by each imaging pixel of the second image sensor 1224 and provide a set of image data that can be processed by the second ISP processor 1240.

A first image captured by the first camera 1210 is transmitted to the first ISP processor 1230 for processing. When the first ISP processor 1230 processes the first image, statistical data of the first image (such as brightness of the image, contrast value of the image, color of the image, etc.) can be sent to the control logic means 1250. The control logic means 1250 can determine control parameters of the first camera 1210 according to the statistical data, so that the first camera 1210 can perform such operations as auto-focus and auto-exposure according to the control parameters. The first image, after being processed by the first ISP processor 1230, may be stored into an image memory 1260. The first ISP processor 1230 may also read the image stored in the image memory 1260, for processing. In addition, the first image, after being processed by the ISP processor 1230, can be directly sent to a display 1270 for display; and the display 1270 can also read the image in the image memory 1260 for display.

The first ISP processor 1230 processes image data pixel by pixel according to a plurality of formats. In one embodiment, each image pixel can have a bit depth of 8, 10, 12, or 14 bits, and the first ISP processor 1230 can perform one or more image processing operations on the image data and collect statistical information on the image data. The image processing operations can be performed according to same or different bit depth precisions.

The image memory 1260 can be part of a memory device, a storage device, or a separate dedicated memory within an electronic apparatus, and can include DMA (Direct Memory Access) features.

Upon receipt of an interface from the first image sensor 1214, the first ISP processor 1230 can perform one or more image processing operations, in one embodiment, time domain filtering. The processed image data can be sent to the image memory 1260 for additional processing prior to being displayed. The first ISP processor 1230 receives the processed data from the image memory 1260 and subjects the processed data into image data processing in RGB and YCbCr color space. The image data processed by the first ISP processor 1230 can be outputted to the display 1270, for being viewed by the user and/or further processed by a graphics engine or a GPU (Graphics Processing Unit). Additionally, the output of the first ISP processor 1230 can also be sent to the image memory 1260, and the display 1270 can read the image data from the image memory 1260. In an embodiment, the image memory 1260 can be configured to implement one or more frame buffers.

Statistical data determined by the first ISP processor 1230 can be sent to the control logic means 1250. In one embodiment, the statistical data may include first image sensor 1214 statistical information such as auto-exposure, auto white balance, auto-focus, flicker detection, black level compensation, first lens 1212 shading correction, and the like. The control logic means 1250 can include a processor and/or a microcontroller that executes one or more routines (e.g., firmware). One or more routines can determine control parameters of the first camera 1210 and control parameters of the ISP processor 1230 based on received statistical data. In one embodiment, the control parameters of the first camera 1210 may include gain, integration time of exposure control, anti-jitter parameters, flash control parameters, first lens 1212 control parameters (e.g., focus or zoom focal length), or combinations of these parameters, and the like. The ISP control parameters may include a gain level and color correction matrix for automatic white balance and color adjustment (e.g., during RGB processing), and a first lens 1212 shading correction parameter.

Likewise, a second image captured by the second camera 1220 is transmitted to the second ISP processor 1240 for processing. After the second ISP processor 1240 processes the first image, statistical data of the second image (such as brightness of the image, contrast value of the image, color of the image, etc.) may be sent to the control logic means 1250. The control logic means 1250 can determine control parameters of the second camera 1220 according to the statistical data, so that the second camera 1220 can perform such operations such as auto-focus and auto-exposure according to the control parameters. The second image, after being processed by the second ISP processor 1240, may be stored into the image memory 1260, and the second ISP processor 1240 may also read the image stored in the image memory 1260, for processing. In addition, the second image, after being processed by the ISP processor 1240, can be directly sent to the display 1270 for display, and the display 1270 can also read the image in the image memory 1260 for display. The second camera 1220 and the second ISP processor 1240 can also implement the processing procedure as described by the first camera 1210 and the first ISP processor 1230.

The embodiments of the present disclosure further provide a computer-readable storage medium. One or more non-transitory computer-readable storage media containing computer-executable instructions are such that the computer executable instructions, when executed by one or more processors, cause the processor to perform the blocks of the image processing method.

A computer program product includes instructions that, when executed on a computer, cause the computer to perform an image processing method.

Any citation of a memory, storage, a database or other medium used in the present disclosure may include non-transitory and/or transitory memories. A non-transitory memory may include a Read-Only Memory (ROM), a Programmable ROM (PROM), an Electrically Programmable ROM (EPROM), an Electrically Erasable Programmable ROM (EEPROM) or a flash memory. The volatile memory may include a Random Access Memory (RAM), and is used as an external high-speed buffer memory. Exemplarily but unlimitedly, the RAM may be obtained in various forms, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), a Rambus Direct RAM (RDRAM), a Direct RDRAM (DRDRAM) and a Rambus Dynamic RAM (RDRAM).

The abovementioned embodiments only describe some implementation modes of the disclosure and are specifically described in detail, but it should not be understood as limits to the scope of the disclosure. It should be pointed out that those of ordinary skilled in the art may further make a plurality of transformations and improvements without departing from the concept of the disclosure and all of these fall within the scope of protection of the disclosure. Therefore, the scope of protection of the patent disclosure should be subject to the appended claims.

What is claimed is:

1. A method for image processing, comprising:

acquiring a first image captured by a first camera according to a first frame rate, and determining a first timestamp according to the first image, wherein the first timestamp is configured to represent a time point on which the first image is captured;

acquiring at least two second images captured by a second camera according to a second frame rate that is greater than the first frame rate, and determining a second timestamp according to the at least two second images, wherein the first camera and the second camera are mounted in an electronic apparatus;

when the electronic apparatus is shaken in the process of acquiring the first image and the at least two second images, acquiring target jitter data of the electronic apparatus, wherein the target jitter data is data other than time data;

when the target jitter data is smaller than a jitter threshold, judging whether the first and the second images are available according to capturing time points and searching for a first interval threshold corresponding to the target jitter data from a pre-established correspondence relationship between jitter data and first interval thresholds;

when the target jitter data is greater than the jitter threshold, discarding the captured first and second images;

processing the first image and the at least two second images when a time interval between the first timestamp and the second timestamp is smaller than the first interval threshold; and performing camera synchronization processing for the first camera and the second camera;

wherein determining the second timestamp according to the at least two second images comprises:
acquiring a capturing time point of anyone of the at least two second images as the second timestamp; or
acquiring an average value of corresponding capturing time points of the respective at least two second images as the second timestamp; and
wherein the camera synchronization processing comprises:
sending the first image together with the first timestamp to a first buffer;
packaging one of the second images together with corresponding flag information, and sending the packaged second image and the corresponding flag information together with the second timestamp to a second buffer;
in response to a time interval between the first timestamp and the second timestamp being smaller than the first interval threshold, reading the first image in the first buffer and performing a first-format conversion for the first image to obtain a first target image, and sending the first target image to a third buffer; and reading the second image and the corresponding flag information in the second buffer and performing a second-format conversion for the second image to obtain a second target image, and sending the second target image to a fourth buffer; and
before sending the first target image and the second target image to an application, packaging the first target image and the second target image and sending the packaged first target image and second target image to a fifth buffer.

2. The method according to claim 1, wherein a time interval between capturing time points of any two of the captured second images is smaller than a second interval threshold; and
wherein, when the time interval between the first timestamp and the second timestamp is larger than the first interval threshold, the acquired first image and second images are discarded.

3. The method according to claim 1, wherein acquiring the target jitter data of the electronic apparatus comprises:
acquiring jitter data one time every preset time length in the process of acquiring the first image and the second images; and
seeking an average value of the acquired jitter data to obtain the target jitter data.

4. The method according to claim 1, further comprising:
prior to processing the first image and the at least two second images when the time interval between the first timestamp and the second timestamp is smaller than the first interval threshold, sending the first image to a first buffer and sending the at least two second images to a second buffer;
wherein processing the first image and the at least two second images when the time interval between the first timestamp and the second timestamp is smaller than the first interval threshold comprises:
when the time interval between the first timestamp and the second timestamp is smaller than the first interval threshold, reading the first image in the first buffer and performing first-format conversion of the first image to generate a first target image;
reading the second images in the second buffer, and performing a second format conversion of the at least two second images to generate a second target image, wherein the second target image is configured to represent depth information corresponding to the first target image; and
processing the first target image and the second target image.

5. The method according to claim 4, wherein sending the at least two second images to the second buffer comprises:
acquiring flag information corresponding to each of the second images, wherein the flag information is configured to represent a sequence of capturing the second images;
determining whether a captured second image is lost according to the flag information, and based on a determination that the captured second image is not lost, packaging the second images and the corresponding flag information; and
sending the packaged second images to the second buffer.

6. The method according to claim 4, wherein processing the first target image and the second target image comprises:
identifying a target object in the first target image, and acquiring target depth information corresponding to the target object according to the second target image; and
processing the target object according to the target depth information.

7. The method according to claim 6, further comprising:
prior to identifying the target object in the first target image, and acquiring the target depth information corresponding to the target object according to the second target image:
packaging the first target image and the second target image; and
sending the packaged first target image and second target image to an application mounted in an electronic apparatus.

8. An electronic apparatus, comprising a non-transitory memory and a processor, wherein the non-transitory memory stores a computer program which, when executed by the processor, causes the processor to perform a method for image processing, wherein the method comprises:
acquiring a first image captured by a first camera according to a first frame rate, and determining a first timestamp according to the first image, wherein the first timestamp is configured to represent a time point on which the first image is captured;
acquiring at least two second images captured by a second camera according to a second frame rate that is greater than the first frame rate, and determining a second timestamp according to the at least two second images, wherein the first camera and the second camera are mounted in an electronic apparatus;
when the electronic apparatus is shaken in the process of acquiring the first image and the at least one second images, acquiring target jitter data of the electronic apparatus, wherein the target jitter data is data other than time data;
when the target jitter data is smaller than a jitter threshold, judging whether the first and second images are available according to capturing time points and searching for a first interval threshold corresponding to the target jitter data from a pre-established correspondence relationship between jitter data and first intervals thresholds;
when the target jitter data is greater than the jitter threshold, discarding the captured first and second images;

processing the first image and the at least two second images when a time interval between the first timestamp and the second timestamp is smaller than the first interval threshold;
performing camera synchronization processing for the first camera and the second camera;
wherein determining the second timestamp according to the at least two second images comprises:
acquiring a capturing time point of anyone of the at least two second images as the second timestamp; or
acquiring an average value of corresponding capturing time points of the respective at least two second images as the second timestamp; and
wherein the camera synchronization processing comprises:
sending the first image together with the first timestamp to a first buffer;
packaging one of the second images together with corresponding flag information, and sending the packaged second image and the corresponding flag information together with the second timestamp to a second buffer;
in response to a time interval between the first timestamp and the second timestamp being smaller than the first interval threshold, reading the first image in the first buffer and performing a first-format conversion for the first image to obtain a first target image, and sending the first target image to a third buffer; and reading the second image and the corresponding flag information in the second buffer and performing a second-format conversion for the second image to obtain a second target image, and sending the second target image to a fourth buffer; and
before sending the first target image and the second target image to an application, packaging the first target image and the second target image and sending the packaged first target image and second target image to a fifth buffer.

9. The electronic apparatus according to claim 8, wherein a time interval between capturing time points of any two of the captured second images is smaller than a second interval threshold; and
wherein, when the time interval between the first timestamp and the second timestamp is larger than the first interval threshold, the acquired first image and second images are discarded.

10. The electronic apparatus according to claim 8, wherein acquiring the target jitter data of the electronic apparatus comprises:
acquiring jitter data one time every preset time length in the process of acquiring the first image and the second images; and
seeking an average value of the acquired jitter data to obtain the target jitter data.

11. The electronic apparatus according to claim 8, wherein the method further comprises: prior to processing the first image and the at least two second images when the time interval between the first timestamp and the second timestamp is smaller than the first interval threshold, sending the first image to a first buffer and sending the at least two second images to a second buffer;
wherein processing the first image and the at least two second images when the time interval between the first timestamp and the second timestamp is smaller than the first interval threshold comprises:
when the time interval between the first timestamp and the second timestamp is smaller than the first interval threshold, reading the first image in the first buffer and performing first-format conversion of the first image to generate a first target image;
reading the second images in the second buffer, and performing a second format conversion of the at least two second images to generate a second target image, wherein the second target image is configured to represent depth information corresponding to the first target image; and
processing the first target image and the second target image.

12. The electronic apparatus according to claim 11, wherein sending the at least two second images to the second buffer comprises:
acquiring flag information corresponding to each of the second images, wherein the flag information is configured to represent a sequence of capturing the second images;
determining whether a captured second image is lost according to the flag information, and based on a determination that the captured second image is not lost, packaging the second images and the corresponding flag information; and
sending the packaged second images to the second buffer.

13. The electronic apparatus according to claim 11, wherein processing the first target image and the second target image comprises:
identifying a target object in the first target image, and acquiring target depth information corresponding to the target object according to the second target image; and
processing the target object according to the target depth information.

14. A non-transitory computer-readable storage medium, having a computer program stored thereon, wherein the computer program, when executed by a processor, implements a method for image processing, wherein the method comprises:
acquiring a first image captured by a first camera according to a first frame rate, and determining a first timestamp according to the first image, wherein the first timestamp is configured to represent a time point on which the first image is captured;
acquiring at least two second images captured by a second camera according to a second frame rate that is greater than the first frame rate, and determining a second timestamp according to the at least two second images, wherein the first camera and the second camera are mounted in an electronic apparatus;
when the electronic apparatus is shaken in the process of acquiring the first image and the at least two second images, acquiring target jitter data of the electronic apparatus, wherein the target jitter data is data other than time data;
when the target jitter data is smaller than a jitter threshold, judging whether the first and second images are available according to capturing time points and searching for a first interval threshold corresponding to the target jitter data from a pre-established correspondence relationship between jitter data and first interval thresholds;
when the target jitter data is greater than the jitter threshold, discarding the captured first and second images;
processing the first image and the at least two second images when a time interval between the first timestamp and the second timestamp is smaller than the first interval threshold; and
performing camera synchronization processing for the first camera and the second camera;

wherein determining the second timestamp according to the at least two second images comprises:
  acquiring a capturing time point of anyone of the at least two second images as the second timestamp; or
  acquiring an average value of corresponding capturing time points of the respective at least two second images as the second timestamp; and
wherein the camera synchronization processing comprises:
  sending the first image together with the first timestamp to a first buffer;
  packaging one of the second images together with corresponding flag information, and sending the packaged second image and the corresponding flag information together with the second timestamp to a second buffer;
  in response to a time interval between the first timestamp and the second timestamp being smaller than the first interval threshold, reading the first image in the first buffer and performing a first-format conversion for the first image to obtain a first target image, and sending the first target image to a third buffer; and reading the second image and the corresponding flag information in the second buffer and performing a second-format conversion for the second image to obtain a second target image, and sending the second target image to a fourth buffer; and
  before sending the first target image and the second target image to an application, packaging the first target image and the second target image and sending the packaged first target image and second target image to a fifth buffer.

15. The non-transitory computer-readable storage medium according to claim 14, wherein a time interval between capturing time points of any two of the captured second images is smaller than a second interval threshold; and
  wherein, when the time interval between the first timestamp and the second timestamp is larger than the first interval threshold, the acquired first image and second images are discarded.

16. The non-transitory computer-readable storage medium according to claim 14, wherein acquiring the target jitter data of the electronic apparatus comprises:
  acquiring jitter data one time every preset time length in the process of acquiring the first image and the second images; and
  seeking an average value of the acquired jitter data to obtain the target jitter data.

17. The non-transitory computer-readable storage medium according to claim 14, wherein the method further comprises:
  prior to processing the first image and the at least two second images when the time interval between the first timestamp and the second timestamp is smaller than the first interval threshold, sending the first image to a first buffer and sending the at least two second images to a second buffer; and
  wherein processing the first image and the at least two second images when the time interval between the first timestamp and the second timestamp is smaller than the first interval threshold comprises:
    when the time interval between the first timestamp and the second timestamp is smaller than the first interval threshold, reading the first image in the first buffer and performing a first format conversion of the first image to generate a first target image;
    reading the second images in the second buffer, and performing a second format conversion of the at least two second images to generate a second target image, wherein the second target image is configured to represent depth information corresponding to the first target image; and
    processing the first target image and the second target image.

18. The method according to claim 1, further comprising:
performing alignment processing for the first image and the second images so that the first image and second images correspond to a same scene.

* * * * *